United States Patent

Florentino et al.

[11] Patent Number: 5,870,422
[45] Date of Patent: Feb. 9, 1999

[54] GAIN GENERATOR FOR HIGH-ENERGY CHEMICAL LASERS

[75] Inventors: Caesar C. Florentino, Palos Verdes; Raj K. Gupta, Moorpark; Jeffrey S. Hartlove, San Pedro; Charles W. Clendening, Jr., Torrance; James L. Reeve, Rancho Palos Verdes, all of Calif.

[73] Assignee: TRW Inc., Redondo Beach, Calif.

[21] Appl. No.: 890,716

[22] Filed: Jul. 9, 1997

[51] Int. Cl.⁶ ...................................................... H01S 3/095
[52] U.S. Cl. .................... 372/89; 372/90; 372/33; 372/34; 372/701
[58] Field of Search .................. 372/89, 92, 701, 372/33, 34, 90

[56] References Cited

U.S. PATENT DOCUMENTS

| | | |
|---|---|---|
| 4,187,595 | 2/1980 | Kuhn, Jr. ........................ 372/90 |
| 4,220,933 | 9/1980 | Kuhn, Jr. ........................ 372/89 |
| 4,731,795 | 3/1988 | Clark et al. . |
| 4,827,479 | 5/1989 | Campbell et al. . |
| 5,285,310 | 2/1994 | Miller et al. . |
| 5,296,331 | 3/1994 | Taguchi . |
| 5,441,843 | 8/1995 | Hara . |
| 5,483,100 | 1/1996 | Marrs et al. . |
| 5,521,932 | 5/1996 | Marshall . |
| 5,530,711 | 6/1996 | Scheps . |
| 5,561,684 | 10/1996 | Martin . |
| 5,563,017 | 10/1996 | Yabuki et al. . |
| 5,625,456 | 4/1997 | Lawandy . |

OTHER PUBLICATIONS

General Electric Co., GE Plastics, Properties Guide, Ultem™ Polyetherimide Resin, 14 pages.

Murdough, Matthew P. et al., "A Portable Chemical Oxygen Iodine Laser", Phillips Laboratory Final Report, 9 pages, (Feb. 1993).

Murdough, Matthew P. et al., "A Portable Chemical Oxygen Iodine Laser", Phillips Laboratory Final Report, 9 pages (Feb. 1993).

*Primary Examiner*—Leon Scott, Jr.
*Attorney, Agent, or Firm*—Michael S. Yatsko

[57] ABSTRACT

A gain generator 10 for use in high-energy flowing gas lasers such as COIL devices comprises a chemical reactant mixing nozzle 12 disposed in a gain medium 16. The nozzle includes a plurality of blades 22 formed of a plastic material resistant to chemical attack at the operating temperature of the gain medium and non-catalytic to $O_2(^1\Delta)$. A preferred material is polyetherimide. The gain medium includes octagonal shaped openings 50 for the optical mode of the laser beam.

19 Claims, 2 Drawing Sheets

GAIN GENERATOR FOR HIGH-ENERGY CHEMICAL LASERS

BACKGROUND

The invention relates to the field of chemical lasers and, more particularly, to a gain generator for use in high-energy flowing gas chemical lasers.

The chemical oxygen-iodine laser (COIL) is a high-energy chemically pumped continuous wave (cw) laser which utilizes electronic transitions between different states of atomic iodine. The COIL can produce continuous high-power and good beam quality due to low pressure operation.

The overall process in the COIL involves the liquid phase generation and flow of electronically excited molecular, singlet-delta oxygen, $O_2(^1\Delta)$, into the gaseous phase. This is followed by electronic energy transfer to metastable atomic iodine to produce the excited state of atomic iodine. $O_2(^1\Delta)$ is generated by a chemical reaction between basic hydrogen peroxide (BHP), $HO_2^-$, and chlorine gas, $Cl_2$. Resonant energy transfer from $O_2(^1\Delta)$ produces excited state atomic iodine $I(P_{1/2})$ and a population inversion:

$$O_2(^1\Delta)+I(P_{3/2}) \rightarrow O_2(^3\Sigma)+I(P_{1/2}) \quad (1)$$

The ground state iodine atoms for reaction (1) can be produced by the dissociation of molecular iodine, $I_2$, introduced into a flow stream of $O_2(^1\Delta)$. The transition between the first electronically excited state of atomic iodine and the ground state generates a photon at 1.315 μm:

$$I(P_{1/2}) \rightarrow I(P_{3/2})+h\nu(1.315 \mu m) \quad (2)$$

Lightweight versions of high-energy chemical lasers are emerging strategic weapons having potential for airborne use. In the gain generator, a resonant transfer of energy occurs through the reaction of the energizing reactant, $O_2(^1\Delta)$, and the lasing reactant, iodine. Lightweight materials are needed in the gain generator for airborne applications where weight reduction reduces fuel consumption and operating costs.

The materials used in the gain generator also need to have resistance to high-temperature chemical attack by aggressive chemicals. In the COIL, the nozzle blades need to be chemically resistant to iodine and also to residual chlorine ($Cl_2$) from $O_2(^1\Delta)$ generation.

Materials used to form the nozzle blades in COIL devices also need to have sufficient mechanical properties at operating temperatures typically as high as 300°–400° F. Strength is needed to maintain acceptable dimensional stability of the nozzle.

Known metallic nozzle materials such as high-purity nickel and nickel-based alloys must be heated to a temperature above about 400° F. to prevent $I_2$ condensation on the blades, which can reduce $I_2$ flow. Consequently, a heating source must be included in the gain generator to heat the nozzle blades.

These metallic materials are also difficult and expensive to cast and machine.

A further need for the nozzle blade material is that it does not catalyze the deactivation of $O_2(^1\Delta)$. Deactivation reduces the amount of $O_2(^1\Delta)$ available in the nozzle for electronic energy transfer to iodine and, thus, reduces photon output.

Another problem encountered in COIL devices is efficiently extracting power from the gain medium while at least satisfactorily matching the laser beam director geometry. In high-energy flowing gas chemical lasers such as COIL devices, it is often advantageous to use a laser beam director with circular optics. Due to diffraction effects, power at the target is increased by filling this aperture as much as possible. High-energy laser gain mediums are typically trapezoidal in shape, however, with a narrower dimension at the nozzle exit plane. Furthermore, the laser power is commonly extracted using an optical resonator which requires that the laser mode have an inversion symmetry about its optical axis.

Known solutions to this problem include either using a rectangular beam and physically clipping the corners after out coupling, or using a circular or elliptical extraction beam. These solutions are less than totally satisfactory. Clipping the corners of a rectangular beam after extraction sacrifices the outcoupled power that is clipped. Furthermore, in laser resonators with inversion symmetry, the rectangle height must be selected to match the shorter width dimension of the gain medium near the nozzle outlet end.

Using a circular or elliptical extraction geometry is also less than totally satisfactory. These geometries are more difficult to fabricate. Also, in transfer lasers such as the COIL, these geometries are less efficient and more sensitive to intensity spikes at the top and bottom.

Thus, there is a need for a gain generator for use in high-energy chemical lasers such as chemical oxygen-iodine lasers that (a) is lightweight; (b) comprises a nozzle that (i) is resistant to high temperature chemical attack, (ii) has sufficient mechanical properties at high temperatures, (iii) includes blades that are easier and less expensive to manufacture than metallic blades, do not require heating by a separate heating source, and do not catalyze deactivation of chemical reactants; and (c) provides both increased power extraction efficiency from the gain medium and satisfactory matching of the laser beam director geometry.

SUMMARY

The present invention provides a gain generator for use in high-energy flowing gas chemical lasers that satisfies the above needs. A gain generator according to the present invention comprises a chemical reactant mixing nozzle to generate photons. The nozzle comprises a plurality of blades disposed in the cavity of a gain medium. Adjacent pairs of blades each define a nozzle passage which extends through the nozzle. A plurality of holes are formed in the blades in communication with the nozzle passage.

The gain generator is particularly suitable for use in chemical oxygen-iodine laser (COIL) devices. During laser operation, $O_2(^1\Delta)$ and $I_2$ are mixed and reacted in the nozzle passages. Other aggressive chemical species such as residual $Cl_2$ also come into contact with the nozzle.

A suitable material resistant to chemical attack by these aggressive chemical species is polyetherimide. This material has a high service temperature and also provides satisfactory mechanical properties at the operating temperature of the nozzle. In addition, polyetherimide is a thermal insulator and does not catalyze the deactivation of $O_2(^1\Delta)$. Polyetherimide is also less expensive and has better machinability than metallic alternatives such as nickel-based alloys. Polyetherimide can also be injection molded in the desired shape. The blades as well as other components of the gain generator can be formed of polyetherimide.

The gain medium includes octagonal shaped openings for the laser beam optical mode. The use of an irregular octagonal scraper mirror with the gain medium in an unstable resonator cavity more efficiently extracts power from the laser gain medium while satisfactorily matching the laser beam director geometry.

Thus, disadvantages of known gain generators used in high-energy flowing gas chemical lasers are overcome in that the present invention (i) is lighter than known gain generators; (ii) is chemically resistant to elevated temperature attack by highly aggressive species; (iii) has satisfactory mechanical properties at elevated temperatures; (iv) comprises blades that are easier and less expensive to manufacture, do not require heating by a separate heat source to prevent condensation, and do not catalyze the deactivation of $O_2(^1\Delta)$; and (v) provides both enhanced power extraction efficiency from the gain medium and satisfactory matching of the laser beam director geometry.

DRAWINGS

These and other features, aspects and advantages of the present invention will become better understood from the following description, appended claims and accompanying drawings, in which:

DESCRIPTION

Figure 1:
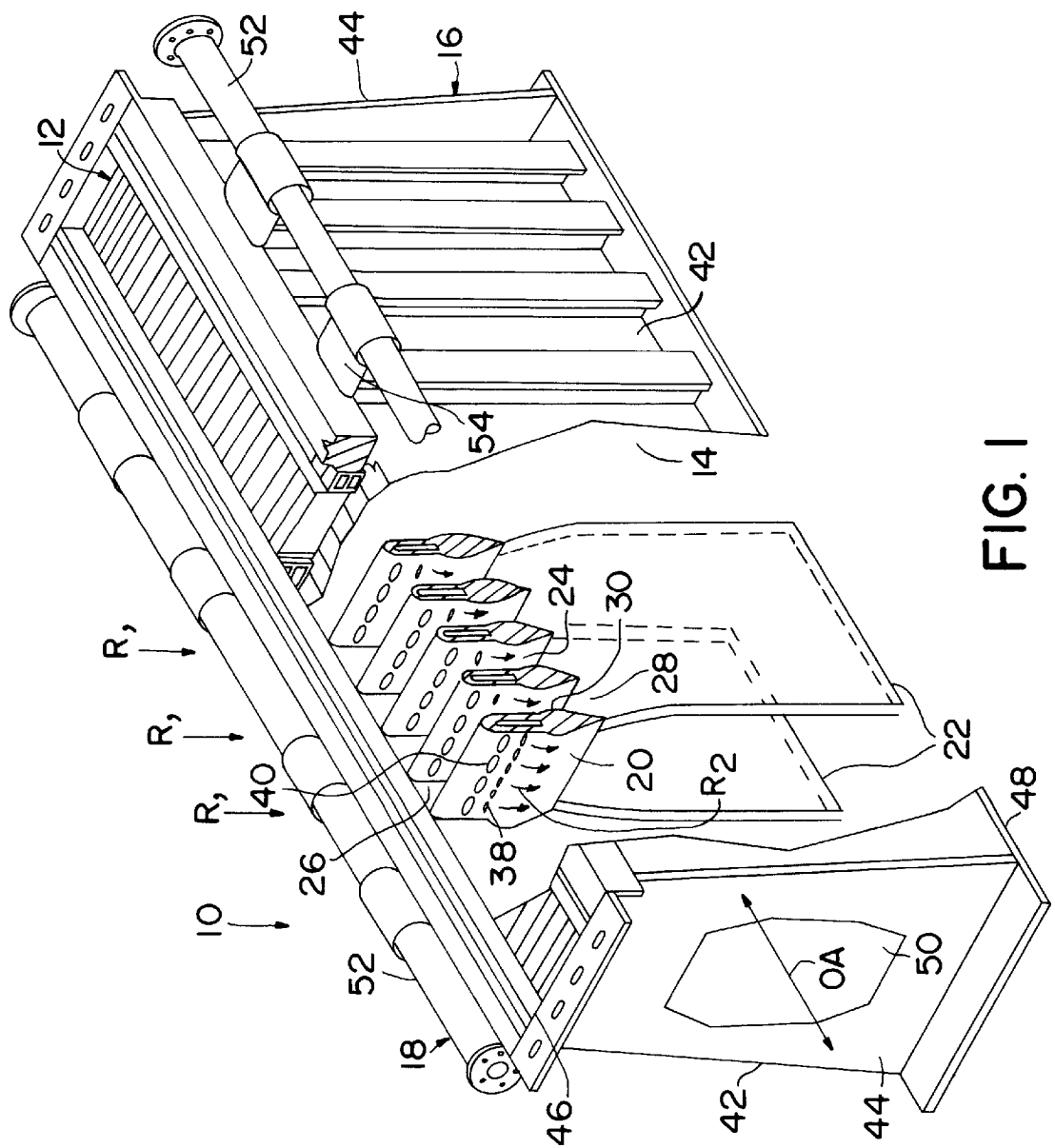
FIG. 1 is a partially broken away perspective view of a gain generator according to the present invention.

A gain generator 10 according to the present invention is illustrated in FIG. 1. The gain generator 10 can be used in high-energy flowing gas lasers. The present invention is described in detail herein with reference to high-energy chemical oxygen-iodine laser (COIL) devices. It is contemplated, however, that the gain generator 10 can be used in other types of flowing gas lasers as well.

The gain generator 10 comprises a chemical reactant mixing nozzle 12 which is disposed in a cavity 14 of a gain medium 16, and a chemical reactant supply manifold 18. The nozzle 12 comprises a plurality of blades 20 arranged in a uniformly spaced, parallel relationship and flow shrouds 22 surrounding the blades 20 to confine the gas flow. Adjacent pairs of the blades 20 define nozzle passages 24 extending through the nozzle 12. The nozzle passages 24 include an inlet end 26, an outlet end 28 and an intermediate throat portion 30. Typically, the nozzle 12 includes at least seventy-five blades 20.

Figure 2:
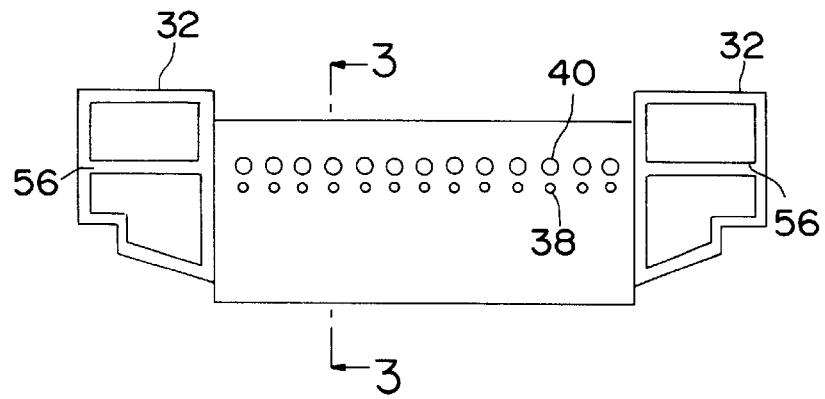
FIG. 2 is a side elevational view of a nozzle blade of the gain generator of FIG. 1.
Figure 3:
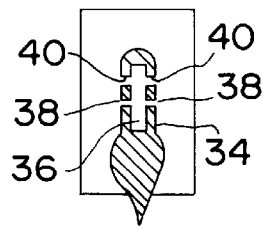
FIG. 3 is a cross-sectional view in the direction of line 3—3 of FIG. 2.

As shown in FIGS. 2 and 3, the blades 20 include a pair of support sections 32, and a wall 34 which defines a passage 36 extending between the support sections 32. A plurality of holes 38, 40 are formed through the wall 34 at opposed sides of the blade 20. The end blades 20 of the nozzle 12 include holes only on the inward facing side of the blade (not shown) as these holes communicate with only one nozzle passage. The holes 38, 40 are typically arranged in at least two spaced rows as shown. The holes in the respective rows can have different diameters. For example, the smaller holes 38 can have a diameter of about 0.01 in., and the larger holes 40 can have a diameter of about 0.02 in. The total number of holes, the hole size and the hole shape in the blades 20 can be varied to control the injection of a chemical reactant into the nozzle passages 24. Typically, at least several hundred total holes are formed in each blade 20.

The gain medium 16 includes strengthened side walls 42, opposed end walls 44 and opposed open ends 46, 48. The gain medium 16 is approximately trapezoidal in shape, having a narrower width at the outlet end 28 of the nozzle passages 24 than at the open end 48 through which laser effluent exits into a diffuser (not shown). The end walls 44 define aligned openings 50 (only one opening is shown) described in greater detail below. The optical axis OA extends through the openings 50 approximately perpendicular to the direction of flow, $R_1$, of the chemical reactant flow stream.

Figure 4:
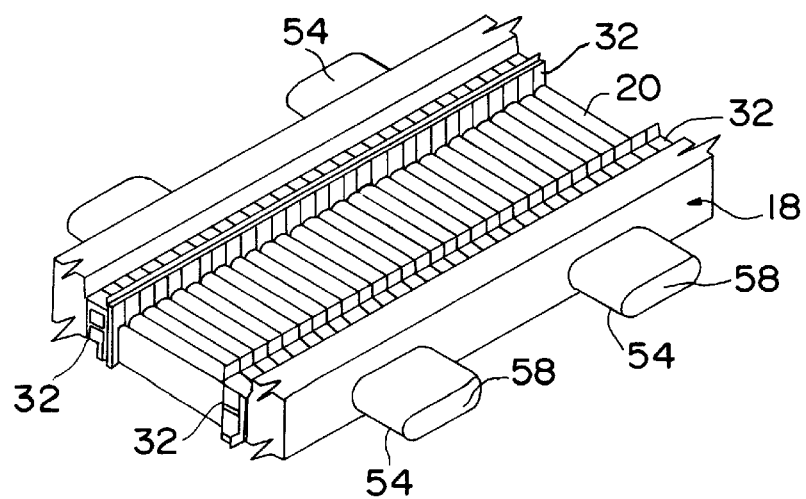
FIG. 4 is a partial view of the portion of the nozzle of the gain generator encircled in broken line in FIG. 1.

The chemical reactant supply manifold 18 comprises a pair of conduits 52 mounted to the sidewalls 42 of the gain medium 16 by connecting sections 54. The connecting sections 54 are attached to the support sections 32 as shown in FIG. 4. The support sections 32 maintain the blades 20 in a substantially equally spaced, parallel relationship relative to each other. The support sections 32 each define a passage 56 therethrough in communication with the passage 36 of the associated blade 20. The connecting sections 54 include passages 58 in communication with the passages 56 in the support sections 32.

The blades 22 can optionally be provided in a plurality of separate modules such as the portion of the nozzle 12 illustrated in FIG. 4, each comprising a plurality of blades. The modules provide the advantage of being selectively replaceable without replacing all of the blades in the nozzle 12 at once.

A chemical reactant is flowed through the conduits 52, into the passages 58 of the connecting sections 54, and through the passages 56 in the support sections 32 into the passages 36 of the blades 20. The chemical reactant is injected through the holes 38, 40 as indicated by arrows $R_2$ (FIG. 1) and into the nozzle passages 24 to mix with another chemical reactant introduced into the nozzle passages 24 at the inlet end 26 as represented by the arrows $R_1$.

As shown, the openings 50 in the gain medium 16 are preferably octagonal shaped. This shape provides advantages when used with an irregular, octagonal shaped scraper mirror in an unstable resonator in transfer flowing gas lasers such as the COIL. Namely, this shape can be inscribed in a circular beam director without added power loss. It can also accommodate cavity side wall expansion. In addition, because transfer lasers store energy, this shape more efficiently extracts energy than expected.

The octagonal shape overcomes the disadvantages associated with using a rectangular beam and physically clipping the corners after out coupling, or using a circular or elliptical extraction beam.

The gain medium is typically formed of a lightweight alloy such as α-β titanium alloys. A suitable titanium alloy is Ti-6% Al-4% V.

In the COIL, resonant energy transfer occurs through the reaction of the energizing reactant, $O_2(^1\Delta)$, and the lasing reactant, $I_2$. $O_2(^1\Delta)$ and byproducts from the generation of $O_2(^1\Delta)$ in a singlet-delta oxygen generator (not shown) including $Cl_2$ and basic hydrogen peroxide (BHP) are introduced into the nozzle passages 24. $I_2$ is injected through the holes 38, 40 into the $O_2(^1\Delta)$ flow stream upstream of the throat portion 26. $O_2(^1\Delta)$ transfers energy to the $I_2$, resulting in the generation of photons of a wavelength of about 1.315 μm.

The operating temperature within the gain generator 10 in the COIL can reach as high as about 300°–400° F. To avoid high-temperature chemical attack by iodine and $Cl_2$, the nozzle 12 can be comprised of a suitable polymeric material. An excellent material is thermoplastic polyetherimide. A suitable polyetherimide material is ULTEM®, commercially available from General Electric Plastics of Pittsfield, Mass.

This material is available in glass reinforced compositions (2000 Series) having enhanced dimensional stability and rigidity. This material has a suitable high service temperature for use in the COIL.

A nozzle of polyetherimide was tested to laser conditions with no visual evidence of physical degradation from exposure to iodine and $Cl_2$. The polyetherimide nozzle also demonstrated sufficient strength and low thermal expansion at the operating temperature of the COIL such that no detrimental dimensional changes of the nozzle were observed.

Polyetherimide is also expected to withstand thermal stress effects such as creep and fatigue caused by repeated heating and cooling cycles, enabling the blades 20 to have an extended service life.

Polyetherimide provides the advantage of being much lighter than metallic alternatives such as nickel-based alloys, making polyetherimide advantageous for airborne applications.

Polyetherimide is also significantly less expensive to form and machine than metallic alternatives. Following injection molding of the blades 20, uniform holes 38, 40 can be formed in the blades easier than in metal blades. The holes enable uniform iodine injection along the blades.

Polyetherimide is also a thermal insulator and does not need to be heated during service using a separate heat source such as an electric heater. The iodine is flowed through the holes 38, 40 of the blades 22 in an iodine/helium mixture at a sufficient temperature to vaporize the iodine. This temperature is typically greater than about 230° F. The hot gas mixture causes a shallow skin layer to form on the blades. The temperature of the skin layer is sufficiently high to substantially prevent $I_2$ condensation.

Polyetherimide also does not catalyze the deactivation of $O_2(^1\Delta)$, thus promoting photon generation in the gain generator.

It is contemplated that plastic materials other than polyetherimide can alternatively be used to form the blades 20 of the nozzle 12. For example, poly ether ketone (PEEK) is believed to have suitable chemical resistance and mechanical properties at the nozzle operating temperature for use in the COIL. PEEK has a service temperature of about 480° F. Another prospective material is SUPEC®, a polyphenylenesulphide resin also available from General Electric Plastics.

Other suitable plastic materials for forming the nozzle blades for use in the COIL would have (i) chemical resistance to chemical species that come into contact with the nozzle during operation; (ii) satisfactory high-temperature mechanical properties to maintain dimensional stability and resist thermal cycling effects; (iii) good machinability; (iv) a low coefficient of thermal expansion and low thermal conductivity; and (v) would not catalyze the deactivation of $O_2(^1\Delta)$. The plastic material preferably has a service temperature greater than about the operating temperature of the nozzle. For COIL devices, the service temperature is preferably at least about 300° F. so that the nozzle retains its mechanical properties during service. Low density is desired for airborne applications.

It is also contemplated that non-metallic materials other than plastics having the above characteristics can be used to form the blades 20.

It is contemplated that components of the gain generator 10 other than the blades 20 can also be formed of polyetherimide to provide the same advantages to these components.

For example, polyetherimide can be advantageous for use in the supply manifold 18 to reduce iodine condensation.

Although the present invention has been described in considerable detail with reference to certain preferred embodiments thereof, other embodiments are possible. Therefore, the scope of the appended claims should not be limited to the description of the preferred embodiments contained herein.

What is claimed is:

1. A chemical reactant mixing nozzle for use in the gain generator of a high-energy chemical laser to generate photons, the nozzle comprising:
   a) a plurality of blades comprised of a plastic material;
   b) a plurality of nozzle passages extending through the nozzle between adjacent pairs of the blades; and
   c) a plurality of holes formed in each blade in communication with at least one of the nozzle passages;
   wherein the plastic material is (i) resistant to chemical attack by chemical species that contact the blades at the operating temperature of the nozzle, and (ii) has a service temperature greater than about the operating temperature of the nozzle.

2. The chemical reactant mixing nozzle of claim 1, wherein the chemical laser is a high-energy chemical oxygen-iodine laser.

3. The chemical reactant mixing nozzle of claim 1, wherein the plastic material is polyetherimide.

4. The chemical reactant mixing nozzle of claim 1, wherein the blades each include support sections at opposed ends of the blades to maintain the blades in a substantially equally spaced, parallel relationship relative to each other in the nozzle.

5. The chemical reactant mixing nozzle of claim 4, wherein the blades each define an interior flow passage in communication with the holes, and the support sections each define a passage therethrough in communication with the flow passage.

6. A chemical reactant mixing nozzle for use in the gain generator of a high-energy chemical oxygen-iodine laser to generate photons, the nozzle comprising:
   a) a plurality of blades comprised of polyetherimide, the blades each including support sections at opposed ends of the blades to maintain the blades in a substantially equally spaced, parallel relationship relative to each other in the nozzle, the blades each defining an interior flow passage, and the support sections each defining a passage therethrough in communication with the flow passage of the blades;
   b) a plurality of nozzle passages extending through the nozzle between adjacent pairs of the blades; and
   c) a plurality of holes formed in each blade in communication with the interior flow passage and at least one of the nozzle passages.

7. A gain generator for use in a high-energy chemical laser, the gain generator comprising:
   a) a nozzle comprising:
      i) a plurality of spaced blades comprised of a plastic material;
      ii) a plurality of nozzle passages extending through the nozzle between adjacent pairs of the blades; and
      iii) a plurality of holes formed in each blade in communication with at least one of nozzle passages;
      wherein the plastic material is (i) resistant to chemical attack by chemical species that contact the blades at the operating temperature of the nozzle, and (ii) has a service temperature greater than about the operating temperature of the nozzle; and b) a gain medium housing the blades, the gain medium including a cavity and a pair of opposed walls each defining an octagonal shaped opening for the optical mode of the laser.

8. The gain generator of claim 7, wherein the chemical laser is a high-energy chemical oxygen-iodine laser.

9. The gain generator of claim 7, wherein the plastic material is polyetherimide.

10. The gain generator of claim 7, wherein the blades each include support sections at opposed ends of the blades to maintain the blades in a substantially equally spaced, parallel relationship relative to each other in the nozzle.

11. The gain generator of claim 10, wherein the blades each define an interior flow passage in communication with the holes, and the support sections each define a passage therethrough in communication with the flow passage.

12. The gain generator of claim 11, wherein the gain generator further comprises a chemical reactant supply manifold in flow communication with the passages in the support sections.

13. The gain generator of claim 12, wherein the nozzle comprises a plurality of modules each including a plurality of blades.

14. The gain generator of claim 7, wherein the nozzle comprises a plurality of modules each including a plurality of blades.

15. The gain generator of claim 7, wherein the gain medium is comprised of $\alpha$-$\beta$ titanium alloy.

16. A method of generating photons in a gain generator of a high-energy chemical oxygen-iodine laser, the method comprising:
a) providing a gain generator comprising a chemical reactant mixing nozzle, the nozzle including:
  i) a plurality of spaced blades comprised of a plastic material; and
  ii) a plurality of nozzle flow passages extending through the nozzle between each adjacent pairs of the blades;
  wherein the plastic material is (i) resistant to chemical attack by chemical species that contact the blades at the operating temperature of the nozzle, and (ii) has a service temperature greater than about the operating temperature of the nozzle; and
b) introducing $O_2(^1\Delta)$ and $I_2$ into the nozzle passages to generate photons.

17. The method of claim 16, wherein the plastic material is polyetherimide.

18. The method of claim 16, wherein the gain generator comprises a gain medium including a cavity, and a pair of opposed walls each defining an octagonal shaped opening for the optical mode of the laser.

19. The method of claim 16, wherein the $O_2(^1\Delta)$ is introduced into the nozzle passages at an inlet end thereof and the $I_2$ is introduced into the nozzle passages downstream of the inlet end.

* * * * *